Jan. 13, 1942. H. STEVENS Re. 22,007

MANIFOLDING DEVICE

Original Filed Dec. 7, 1932 2 Sheets-Sheet 1

INVENTOR
HARRY STEVENS, DEC'D.
BY KAREN STEVENS, EXECUTRIX
BY
Carl W. Weeks
ATTORNEY Jan. 13, 1942. H. STEVENS Re. 22,007

MANIFOLDING DEVICE

Original Filed Dec. 7, 1932 2 Sheets-Sheet 2

INVENTOR
HARRY STEVENS, DEC'D.
BY KAREN STEVENS, EXECUTRIX
BY Carl W. Weeks,
ATTORNEY Reissued Jan. 13, 1942 Re. 22,007

UNITED STATES PATENT OFFICE 22,007

MANIFOLDING DEVICE

Harry Stevens, deceased, late of Niagara Falls, N. Y., by Karen Stevens, executrix, Niagara Falls, N. Y.; said Harry Stevens assignor, by mesne assignments, to American Sales Book Company, Inc., Niagara Falls, N. Y., a corporation of Delaware Original No. 2,120,163, dated June 7, 1938, Serial No. 646,041, December 7, 1932. Application for reissue December 5, 1939, Serial No. 307,719

10 Claims. (Cl. 282—24)

This invention relates to improvements in manifolding devices, and more particularly to an improvement of assembled record and transfer leaves.

It is a general object of the invention to provide an improved assembly of record and transfer leaves attached together and arranged in a supply pad in an improved manner, whereby auxiliary manifolding assemblies, each including at least one record leaf with an attached transfer leaf, may be successively detached from the assembly and used in connection with an additional or original record leaf for transferring and recording the inscriptions made upon the original record leaf.

According to an important feature of the invention, a record supply pad is provided having record leaves and transfer leaves of the one-time type arranged in alternation with each other and connected into the pad in an improved manner, whereby the leaves may be severed from the pad and yet remain attached to each other to form an auxiliary manifolding assembly capable of use in connection with an additional record leaf for receiving transfer inscriptions.

It is a further object of the invention to provide a manifolding assembly of the class mentioned in which the record and transfer leaves are arranged in an improved manner for successive detachment in attached sets or auxiliary assemblies, and furthermore are arranged so as to protect the transfer leaves by an overlying record leaf after each successive set detachment.

A further object is to provide the assembly with weakened severance lines selectively arranged in certain of the leaves, for instance in the record leaves, whereby said leaves may be selectively detached in a convenient manner from the other attached leaves.

Other objects of the invention will be in part pointed out in the following detailed description of certain illustrative but preferred embodiments of the invention, and will be in part obvious in connection therewith.

The invention accordingly comprises the features of construction, combinations of elements, and arrangement of parts, which will be exemplied in the construction hereinafter set forth, and the scope of the application of which will be indicated in the claims.

For a more complete disclosure and understanding of the nature and objects of the invention, reference is had to the following detailed description and to the accompanying drawings, in which.

Figure 1:
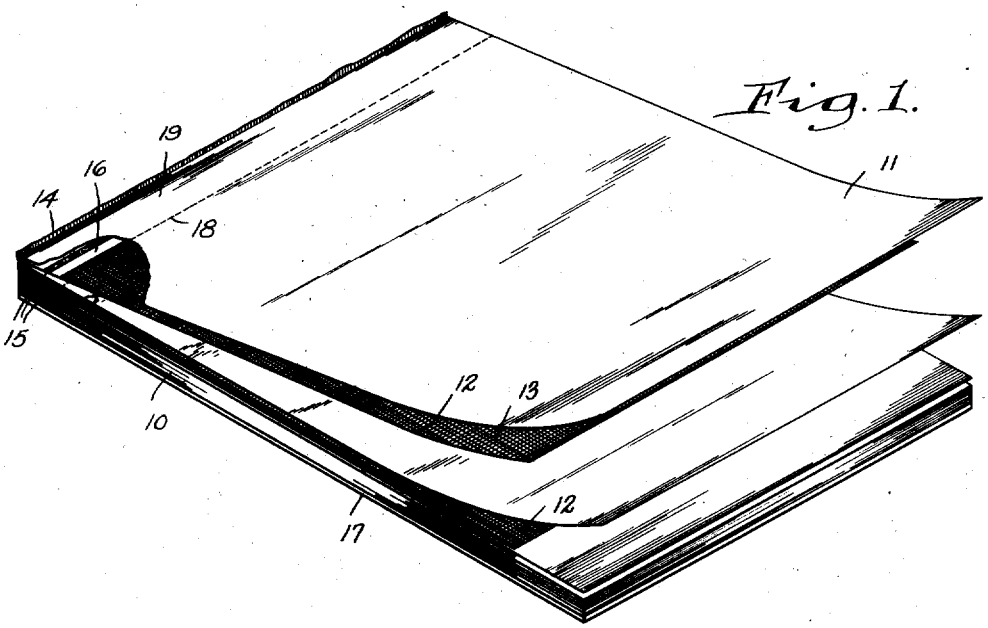
Fig. 1 is a partially diagrammatic perspective view of a manifolding supply pad embodying a preferred form of the invention.
Figure 2:
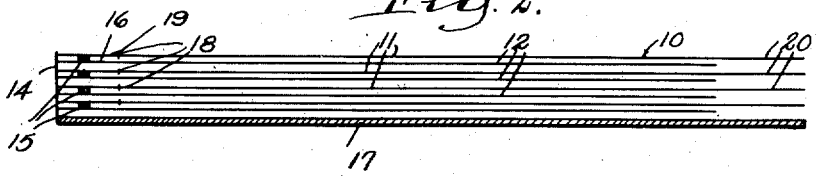
Fig. 2 is a longitudinal vertical partially diagrammatic sectional view of Fig. 1.

Reference is first had to the embodiment of Figs. 1 and 2 for a detailed description of the invention wherein is illustrated a pad or assembly 10 of record leaves 11 and transfer leaves 12. The record or copy leaves 11 may be of any desired quality of paper suitable for receiving inscriptions either by the use of a pen or pencil, or of a writing machine, but in this embodiment the record leaves may be thin and of an inferior quality of paper inasmuch as they are to be used as duplicate or copy record leaves for the reception of transfer inscriptions by means of the transfer leaves.

The transfer leaves 12 are of the one-time type, that is, they are intended to be used for a single transfer inscription whereupon they are ordinarily discarded. Therefore, they may be made of relatively light and inexpensive paper and the transfer or carbon coatings 13 may be relatively light and thin. Although the carbon coatings may be at both upper and lower surfaces of the transfer leaves, said coatings, as shown in Figs. 1 and 2, are only upon the upwardly facing surfaces of the transfer leaves, while the lower surfaces are entirely free of transfer material. It will be understood that the manifolding pad may be made up to include as many record and transfer leaves as required for different purposes. It will be observed that the record and transfer leaves are arranged in alternation with each other in the assembly and that for every record leaf there is a companion transfer leaf arranged in superposed manifolding relation therewith and adapted to transfer the inscriptions thereto. For convenience a record leaf with its companion transfer leaf is herein referred to as a manifolding couplet. It will be noted that the record leaf of each manifolding couplet overlies its companion transfer leaf and that the transfer surface is upwardly disposed. By virtue of this arrangement the top exposed leaf of the pad is always a record leaf and the transfer leaves are accordingly always protected by at least one overlying record leaf.

All of the record and transfer leaves of the assembly are connected together into the pad at one edge or marginal portion thereof to provide a unitary compact assembly of manifolding couplets. A preferred form of attaching the leaves together is by means of a layer of adhesive or padding 14 which may be applied directly to the edges of the leaves as shown. This attachment formed in this manner is frangible or easily broken, whereby the leaves or manifolding couplets may be readily detached from the pad. By means of this arrangement, one or more of the manifolding couplets may be severed from the pad by breaking the frangible attachment along a transverse line just below the lowermost leaf. Thus the detached leaves are left attached to each other in a unitary group after detachment from the pad. However, in order to assure the continued attachment of the leaves of the manifolding couplet after detachment from the supply pad, the record leaf 11 and transfer leaf 12 of each couplet may be additionally attached together at the binding margin thereof. Such an attachment is indicated by the lines of adhesive 15 extending transversely of the pad. The attaching margins or stubs 16 of the transfer leaves may be free of transfer material so as to facilitate the adhesive attachment.

While the record leaves 11 and transfer leaves 12 are shown in Figs. 1 and 2 as being marginally attached in groups of two by the adhesive attachments 15, it will be understood that larger groups of record and transfer leaves may be thus attached together. In other words, a detachable group or auxiliary manifolding assembly may be made up by a single manifolding couplet, or it may include two or more of these manifolding couplets. Each auxiliary manifolding assembly is separated or segregated from its companions by the omission of adhesive attachments 15 between the adjacent auxiliary assemblies as clearly shown in Figs. 1 and 2. This construction facilitates the detachment of the auxiliary manifolding groups or assemblies of leaves from the supply pad, while at the same time the detached groups will remain attached together.

To provide a support for the manifolding pad and to protect the leaves, a supporting back or sheet 17 of relatively heavy pasteboard or fibreboard is attached in position upon the back of the pad. In the construction shown, this backing sheet is attached in position by the adhesive attachment 14.

Running parallel and adjacent to the attachments 14 and 15 are weakened severance lines 18 positioned selectively only in the record leaves 11, while the corresponding parts of the transfer leaves 12 are unweakened and remain of the full, orignial strength of the paper all the way to the ends of the binding stub part 16. Detachable binding stubs 19 are thus provided for the record leaves 11 and the adhesive attachments 15 are positioned at this stub portion between the respective weakened lines 18 and the marginal attachment 14.

At the marginal parts of the record and transfer leaves opposite to the bound margins thereof, selective grip formations are provided as shown in Figs. 1 and 2, whereby the record leaves 11 may be gripped to the exclusion of the transfer leaves. In the embodiment shown, this selective grip is provided by extending the ends or marginal portions 20 of the record leaves a short distance beyond the adjacent edges of the transfer leaves.

In use, an auxiliary manifolding assembly including one or more of the manifolding couplets is severed from the supply pad containing a multiplicity of the record and transfer leaves. The severance is accomplished by lifting the outer edges of the auxiliary manifolding assembly and severing it from the pad along the frangible attachment 14. After this detachment, the leaves of the detached auxiliary assembly remain attached to each other by virtue of the attachments 14 and 15 as described. The detached assembly is then turned over, thus bringing the transfer leaf 12 in upward position. An original record leaf which may include a printed letterhead, or other appropriate data, is then placed in interleaved overlying position with the leaves of the assembly, whereupon the inscription may be entered upon the original leaf by placing the assembly in a typewriting machine or otherwise. The copy or record leaves 11 thus remain attached to the transfer leaves 12. In this manner a great deal of time is saved and perfect, clean copies are assured.

When the inscriptions have been completed, the transfer leaves 12 are removed from the record leaves of the assembly by grasping said assembly at the attached marginal portion 19 thereof and at the selective grip portion 20. Severance of the record leaves along the weakened lines 18 is thus very readily effected and at the same movement the transfer leaves are stripped or removed from interleaved relation with the record leaves. This operation is effected at a single movement effecting saving of time and avoiding undue handling of the transfer and record leaves.

Figure 3:
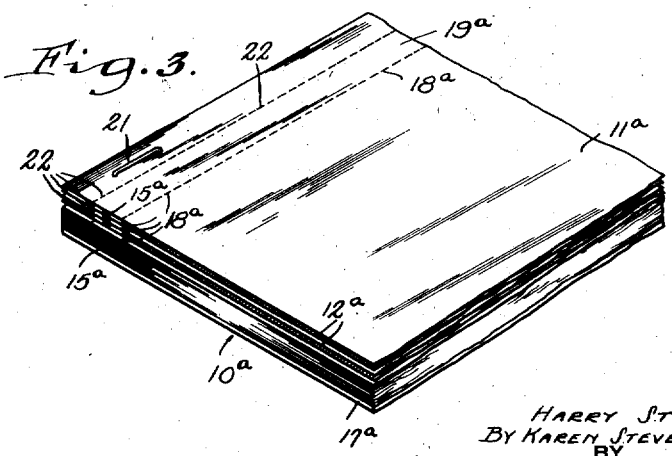
Fig. 3 is a fragmentary perspective view similar to Fig. 1, but illustrating another preferred embodiment of the invention.

Results similar to those above described may be accomplished by the modified embodiment of Fig. 3 in which corresponding elements are indicated by the same reference numerals with the addition of the index *a*. The structure of this embodiment may be substantially as described above in connection with Figs. 1 and 2, except as herein specified. In this embodiment the record and transfer leaves are connected into the supply pad by means of attaching devices 21 which may be in the form of textile stitching, or staples of light wire extending through the leaves and backing 17*a*. Also, in this embodiment the adhesive attachment 15*a* is arranged to connect the record and transfer leaves together in auxiliary groups or assemblies of two record leaves and two transfer leaves. In other words, each auxiliary manifolding assembly includes two manifolding couplets, each having a record leaf 11*a* and companion transfer leaf 12*a*; the number of couplets, of course, may be varied.

Also, in Fig. 3 all of the record and transfer leaves are provided with transverse weakened severance lines 22 positioned between the attaching staples 21 and the adhesive attachments 15*a*. This structure provides a detachable attachment for each of the auxiliary manifolding asssemblies. When it is desired to detach one of these assemblies from the pad, this may readily be accomplished by detachment along the weakened lines 22. The weakened severance lines 18*a* are selectively positioned only in the record leaves 11a, as described in connection with Figs. 1 and 2, and they are positioned just inside of the adhesive attachments 15a. This arrangement provides the attaching stub 19a corresponding to the stub 19 of Figs. 1 and 2 and this may be utilized in a similar manner for selective detachment of the record leaves from the stubs and for stripping or removal of the transfer leaves from their interleaved relation with the record leaves. This operation is similar to that above described in connection with Figs. 1 and 2. It will be noted, furthermore, in connection with this embodiment, that the leaves of each auxiliary assembly are connected at their edge portions near their tops or upper ends by the fastening means 15a at points spaced some distance from the binding means 21, the adjacent auxiliary assemblies being free from attachment with each other at marginal portions adjacent to the fastening means. The leaves of the top auxiliary assembly may thus be raised together as an integral unit at the attaching means 15a thus facilitating the severing of the assembly from the binding. By this means, the top auxiliary assembly may be more readily grasped when it is desired to sever the same.

Figure 4:
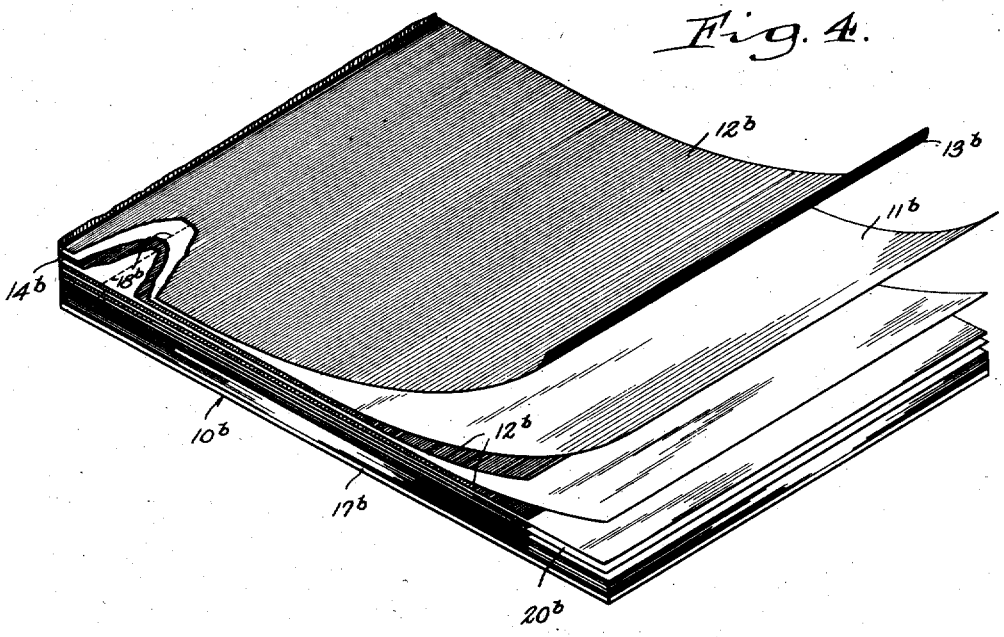
Fig. 4 is a view similar to Fig. 1 illustrating a further modified embodiment.
Figure 5:
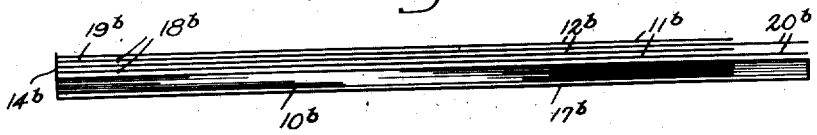
Fig. 5 is a side elevation of Fig. 4.
Figure 6:
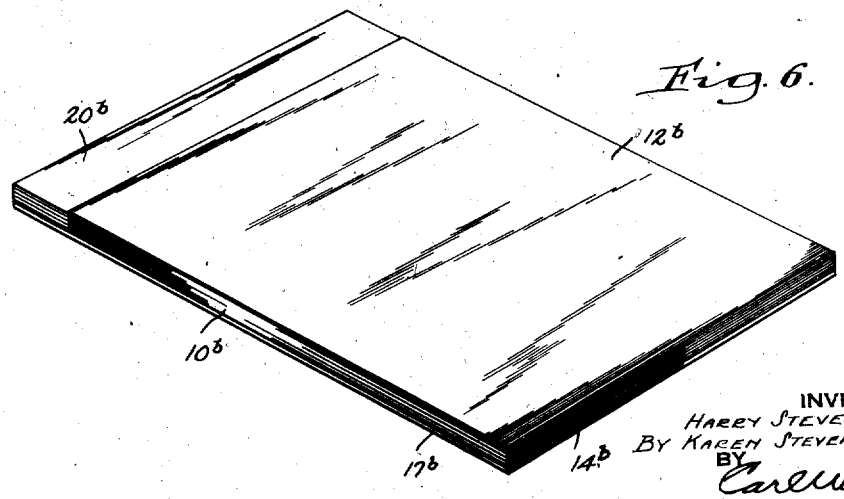
Fig. 6 is a perspective view showing one form of the frangible attachment or padding for connecting leaves of the assembly together in the pad.

A further modified embodiment is disclosed in Figs 4, 5 and 6 wherein corresponding parts are designated by the same reference numerals with the addition of the index b. In this embodiment the transfer leaves 12b of each couplet overlie their companion record leaves 11b and the carbonized surfaces 13b thereof face downwardly in the assembly toward the supporting back 17b. The record and transfer leaves are marginally attached together in the pad by means of the frangible attachment 14b, as described in connection with Figs. 1 and 2. Also, the record leaves 11b are provided with transverse weakened severance lines 18b positioned only in the record leaves, while the transfer leaves 12b are correspondingly unweakened in the same manner as disclosed in Figs. 1 and 2. Also, the selective grip structure 20b may be the same. With this arrangement it is clear in connection with the foregoing disclosure that as many manifolding couplets as desired may be simultaneously detached from the pad and that the leaves of the detached assembly will remain attached by virtue of the frangible edge attachment 14b. Since the transfer leaf of each couplet overlies its companion record leaf, it is unnecessary to invert it after severance from the pad. The detached auxiliary assembly may then be used in connection with a separate or original leaf which is placed in overlying manifolding relation as already described.

It will be understood that the disclosure of the drawings is partially diagrammatic, the leaves in several views being shown as abnormally separated so as to show the structure more clearly. It will be understood that in actual practice the leaves lie in close contact with each other face to face in the usual manner. Any desired printed matter may be placed on the record leaves of the pad, such as blank forms, heading data, etc., and the auxiliary manifolding assemblies may be serially numbered in order to facilitate their severance from the pad.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described the invention, what is claimed as new and desired to secure by Letters Patent is:

1. A manifolding pad including, in combination, a multiplicity of record and transfer leaves arranged in alternation throughout the pad thickness and in interleaved inscription transfer relation with each other to form manifolding couplets, said leaves including a plurality of auxiliary manifolding assemblies each having one or more of said manifolding couplets, a detachable attaching means binding said leaves together in a pad whereby the auxiliary assemblies may be successively severed from the pad, a supporting back attached to the pad, the record and transfer leaves of each said auxiliary manifolding assembly having attachment with each other separate from said attaching means and positioned inwardly of the pad therefrom but at the same marginal part of the pad, said pad having weakened severance lines at said marginal pad part and selectively positioned only in the record leaves and extending along, but spaced inwardly a short distance from, said leaf attachments, said attachments for the record and transfer leaves of the auxiliary assemblies being positioned intermediate said detachable attaching means and said weakened severance lines so as to hold the record and transfer leaves together after severance of the auxiliary assembly from the pad, and a selective grip formation remote from said severance lines providing for gripping record leaves to the exclusion of the transfer leaves for selective severance of the record leaves along the severance lines.

2. A manifolding pad including, in combination, a multiplicity of record and transfer leaves arranged in alternation throughout the pad thickness and in interleaved inscription transfer relation with each other to form manifolding couplets, said leaves including a plurality of manifolding auxiliary assemblies bound into the pad and each having one or more of said manifolding couplets, attaching means separate from the binding attaching together the record and transfer leaves of each auxiliary assembly, transverse weakened severance lines positioned adjacent to and respectively at each of the opposite sides of said attaching means in each auxiliary assembly, said severance lines at the outer side of said attaching means being positioned in all of the record and transfer leaves and those at the inner side of the attaching means being positioned selectively only in certain of the leaves to the exclusion of the others, and a selective grip formation for each auxiliary assembly remote from said attaching means and from said selectively positioned severance lines providing for gripping the leaves having said selective severance lines of the respective assembly to the exclusion of the others for selective severance of the leaves from the assembly.

3. A manifolding pad including, in combination a multiplicity of copy record leaves and transfer leaves, said copy and transfer leaves being arranged in alternation throughout the pad thickness to form manifolding couplets, each couplet having one of said transfer leaves and one of said copy record leaves in inscription transfer relation with each other, said record and transfer leaves being arranged in a plurality of separate auxiliary manifolding assemblies each having one or more of said manifolding couplets, said copy and transfer leaves of said couplets being the only manifolding leaves in each of said auxiliary assemblies, a readily severable binding attachment binding all of said auxiliary manifolding assemblies in the pad, and leaf holding means for holding the copy and transfer leaves of each auxiliary manifolding assembly together in transfer relation after an auxiliary assembly has been severed at said severable binding from the pad.

4. A manifolding pad including, in combination, a multiplicity of copy record leaves and transfer leaves, said copy and transfer leaves being arranged in alternation throughout the pad thickness to form manifolding couplets, each couplet having one of said transfer leaves and one of said copy record leaves in inscription transfer relation with each other, said record and transfer leaves being arranged in a plurality of separate auxiliary manifolding assemblies each having one or more of said manifolding couplets, said copy and transfer leaves of said couplets being the only manifolding leaves in each of said auxiliary assemblies, a readily severable binding attachment binding all of said auxiliary manifolding assemblies in the pad, leaf holding means for holding the copy and transfer leaves of each auxiliary manifolding assembly together in transfer relation after an auxiliary assembly has been severed at said severable binding from the pad, each of said copy record leaves of each said couplet having a marginal portion remote from said binding attachment extending beyond the adjacent edge of said transfer leaf to form a selective grip, and each said copy leaf having a weakened severance line lying along a marginal part thereof adjacent said binding attachment.

5. A manifolding pad including, in combination, a multiplicity of copy record leaves and transfer leaves, said copy and transfer leaves being arranged in alternation throughout the pad thickness to form manifolding couplets, each couplet having one of said transfer leaves and one of said copy record leaves in inscription transfer relation with each other, said record and transfer leaves being arranged in a plurality of separate auxiliary manifolding assemblies each having one or more of said manifolding couplets, said copy and transfer leaves of said couplets being the only manifolding leaves in each of said auxiliary assemblies, a readily severable binding attachment binding all of said auxiliary manifolding assemblies in the pad, and leaf attaching means adjacent to said binding attachment and attaching all of the copy and transfer leaves of each said auxiliary assembly together, the respective adjacent leaves of adjacent auxiliary assemblies being free from attachment with each other corresponding to said leaf attaching means.

6. A manifolding pad including, in combination, a multiplicity of copy record leaves and transfer leaves, said copy and transfer leaves being arranged in alternation throughout the pad thickness to form manifolding couplets, each couplet having one of said transfer leaves and one of said copy record leaves in inscription transfer relation with each other, said record and transfer leaves being arranged in a plurality of separate auxiliary manifolding assemblies each having one or more of said manifolding couplets, said copy and transfer leaves of said couplets being the only manifolding leaves in each of said auxiliary assemblies, a readily severable binding attachment binding all of said auxiliary manifolding assemblies in the pad, leaf attaching means adjacent to said binding attachment and attaching all of the copy and transfer leaves of each said auxiliary assembly together, the respective adjacent leaves of adjacent auxiliary assemblies being free from attachment with each other corresponding to said leaf attaching means, each of said copy record leaves of each said couplet having a marginal portion remote from said binding attachment extending beyond the adjacent edge of said transfer leaf to form a selective grip, and each said copy leaf having a weakened severance line lying along a marginal part thereof adjacent said binding attachment.

7. A manifolding pad including, in combination, a multiplicity of copy record leaves and transfer leaves, said copy and transfer leaves being arranged in alternation throughout the pad thickness to form manifolding couplets, each couplet having one of said transfer leaves and one of said copy record leaves in inscription transfer relation with each other, said record and transfer leaves being arranged in a plurality of separate auxiliary manifolding assemblies each having one or more of said manifolding couplets, said copy and transfer leaves of said couplets being the only manifolding leaves in each of said auxiliary assemblies, a readily severable binding attachment binding all of said auxiliary manifolding assemblies in the pad, leaf attaching means adjacent to said binding attachment and attaching all of the copy and transfer leaves of each said auxiliary assembly together, the respective adjacent leaves of adjacent auxiliary assemblies being free from attachment with each other corresponding to said leaf attaching means, each of said copy record leaves of each said couplet having a marginal portion remote from said binding attachment extending beyond the adjacent edge of said transfer leaf to form a selective grip, each said copy leaf having a weakened severance line lying along a marginal part thereof adjacent said binding attachment, said breakable binding attachment including binding means and weakened severance lines in the auxiliary assembly leaves inside of said binding means, and said leaf attaching means of the auxiliary assemblies being positioned intermediate said last mentioned severance lines and said weakened severance lines of the copy record leaves.

8. A manifolding pad including, in combination, a multiplicity of record and transfer leaves arranged in interleaved inscription transfer relation with each other, said leaves being grouped into a plurality of auxiliary manifolding assemblies each including record and transfer leaves, said record and transfer leaves of each said auxiliary assembly having attachment with each other substantially at edge portions of the leaves, binding means at a marginal portion of the pad binding a plurality of said auxiliary assemblies in superposed relation in the pad and spaced at a distance inwardly from said edge portions of the leaves having said attachments, the portions of adjacent auxiliary assemblies between said attachments and said inwardly spaced binding means being free from attachment with each other, and said attachments being positioned adjacent to the bound end of the pad whereby the portions of the auxiliary assembly leaves having said attachments may be raised together as a unit to facilitate detachment of an auxiliary assembly from the pad.

9. A manifolding pad including, in combination, a multiplicity of record and transfer leaves arranged in interleaved inscription transfer relation with each other, said leaves being grouped into a plurality of auxiliary manifolding assemblies each including record and transfer leaves, said record and transfer leaves of each said auxiliary assembly having attachment with each other substantiallly at edge portions of the leaves, binding means at a marginal portion of the pad binding a plurality of said auxiliary assemblies in superposed relation in the pad and spaced at a distance inwardly from said edge portions of the leaves having said attachments, the portions of adjacent auxiliary assemblies between said attachments and said inwardly spaced binding means being free from attachment with each other, said attachments being positioned adjacent to the bound end of the pad whereby the portions of the auxiliary assembly leaves having said attachments may be raised together as a unit to facilitate detachment of an auxiliary assembly from the pad, said leaves of the auxiliary assemblies having readily severable attachment with said binding means, and certain of the leaves having weakened severance lines positioned inside of said attachments.

10. A manifolding couplet for use in manifolding assemblies and including manifolding leaves, said manifolding leaves of the couplet consisting only of a record leaf exposed at one surface of the couplet and a transfer leaf exposed at the opposite surface thereof, said leaves being arranged in superposed manifolding relation with each other with the transfer leaf having a transfer surface positioned for transfer inscription on said couplet record leaf, one of said couplet leaves having a weakened severance line forming a severable binding stub with which the other said couplet leaf has attachment, said transfer leaf extending from said stub attachment into superposed transfer relation with said couplet record leaf, whereby said couplet, either alone or with another similar superposed couplet, forms a manifolding assembly adapted to be positioned in superposed transfer relation with a separate free record leaf for simultaneous inscription reception by the complete assembly thus formed, said couplet leaf with the weakened severance line having a marginal portion extending beyond the adjacent edge of the other couplet leaf to provide a selective grip formation spaced beyond and at the opposite side of said severance line from said binding stub, whereby said couplet can be simultaneously gripped at said binding stub and at said selective grip formation to effect quick separation of the couplet record and transfer leaves from each other and at the same time to effect severance of one of said couplet leaves from said binding stub along said weakened severance line thereof.

KAREN STEVENS,

*Executrix of the Last Will and Testament of Harry Stevens, Deceased.*